No. 669,814. Patented Mar. 12, 1901.
O. TEIGEN.
VEHICLE WHEEL.
(Application filed Dec. 17, 1900.)
(No Model.)
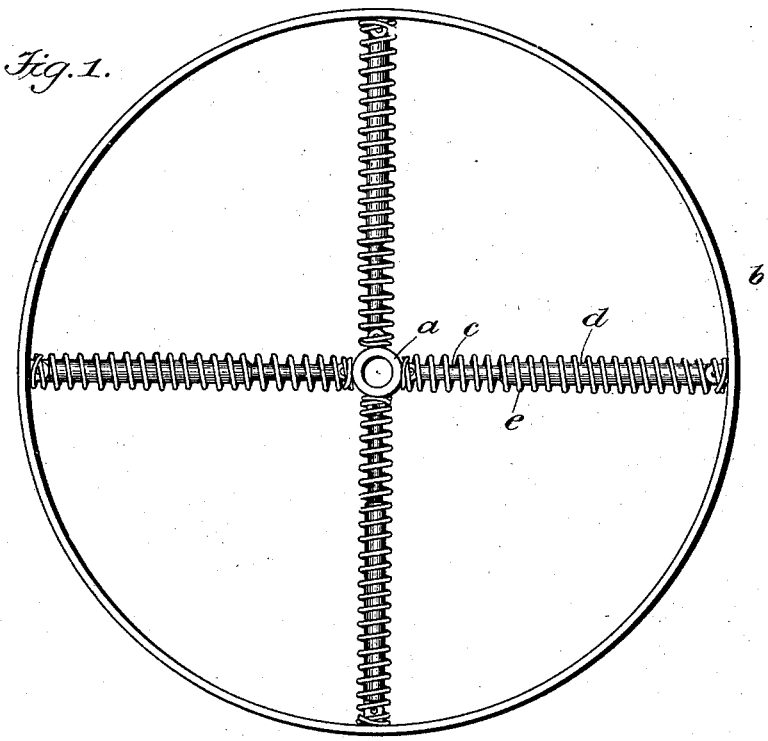
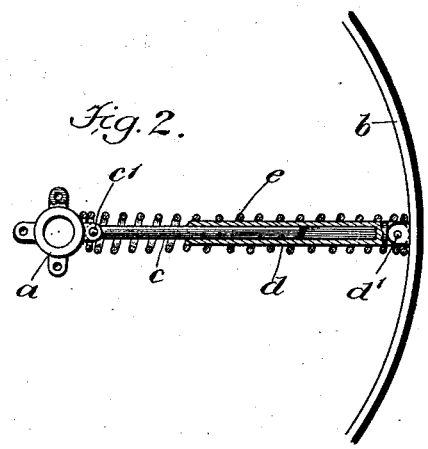
WITNESSES:
INVENTOR
Otto Teigen
BY
ATTORNEYS

UNITED STATES PATENT OFFICE.

OTTO TEIGEN, OF LOWRY, MINNESOTA.

VEHICLE-WHEEL.

SPECIFICATION forming part of Letters Patent No. 669,814, dated March 12, 1901.

Application filed December 17, 1900. Serial No. 40,189. (No model.)

*To all whom it may concern:*

Be it known that I, OTTO TEIGEN, a citizen of the United States, and a resident of Lowry, in the county of Pope and State of Minnesota, have invented a new and Improved Vehicle-Wheel, of which the following is a full, clear, and exact description.

The purpose of this invention is to provide a vehicle-wheel which will yieldingly support its load; and to this end my invention embodies a wheel with its rim and hub connected by longitudinally extensible and contractible spokes hinged to said parts and carrying springs, which have their ends respectively in connection with the hub and rim.

This specification is a specific description of one form of the invention, while the claim is a definition of the actual scope thereof.

Reference is to be had to the accompanying drawings, forming a part of this specification, in which similar characters of reference indicate corresponding parts in both views.

Figure 1 is a side view of the invention, and Fig. 2 is a fragmentary section thereof.

$a$ represents the hub of a wheel, and $b$ the rim. The extensible and contractible spokes are formed of two sections $c$ and $d$, the former of which telescope within the latter, and the sections $c$ being hinged to the hub at the points $c'$ and the sections $d$ being hinged to the rim at the points $d'$.

$e$ represents the springs, which are one for each spoke and which are here shown as metallic spirals inclosing the spokes. These springs have their ends respectively fastened to the hub and rim of the wheel. With this construction the weight of the vehicle is yieldingly supported on the rim of the wheel, since the hub may move freely within a certain area, subject, of course, to the action of the springs $e$, which, it will be observed, exercise both an expansive and contractile tension.

Having thus described my invention, I claim as new and desire to secure by Letters Patent—

A wheel, comprising a hub, a rim, spokes extending between the hub and rim and comprising telescopic sections respectively in pivotal connection with the hub and rim, and springs respectively inclosing the spokes and having their ends connected with the hub and rim.

In testimony whereof I have signed my name to this specification in the presence of two subscribing witnesses.

OTTO TEIGEN.

Witnesses:
T. O. OFSTHUN,
E. KOEFOD.